United States Patent Office 3,110,666
Patented Nov. 12, 1963

1

3,110,666
PREVENTING DEPOSITION OF COPPER AND IRON SALTS FROM ALKALINE AQUEOUS SOLUTIONS
Norman Hedley and Howard Tabachnick, Stamford, Conn., assignors to American Cyanamid Company, New York, N.Y., a corporation of Maine
No Drawing. Filed May 18, 1960, Ser. No. 29,795
9 Claims. (Cl. 210—58)

This invention relates to the prevention of deposition or precipitation from solutions having an alkaline pH of iron salts and/or copper salts, where the solution results from alkalizing an acid solution, using a water-soluble polyelectrolyte having a molecular weight of at least 10,000.

In many operations or industrial processes, the deposition or precipitation of metal salts, and in particular, iron and copper salts, from aqueous media, constitutes a serious problem.

With respect to iron salts such as iron carbonates, iron hydroxides, iron chlorides, iron sulfates and the like, the precipitations from these are a definite disadvantage and a source of continuing difficulty in pipelines, leaching operations, on filters and filter cloths, in laundering operations, in the selective separation of valuable metals from undesirable and troublesome iron salts and in the industrial uses of water where the deposition of iron salts on equipment such as heat exchangers, boilers and the like frequently results in work stoppage for cleaning, replacement and repair of such equipment.

With respect to copper salts, these have been particularly troublesome in industrial operations such as dyeing, in manufacture of textiles, in the paper and pigment industries wherein the presence of small amounts of copper deposited in the finished material or article is undesirable. The copper may be present in the starting materials employed in these and other industrial processes or it may originate from the brass, bronze, copper and Monel metals in the equipment employed in such industrial processes.

Additionally, in the sterilization of water, copper salts are sometimes employed. The holding of copper in these solutions or the prevention of it from precipitation increases the effectiveness of copper added for such purposes.

Heretofore, numerous agents have been employed for purposes of preventing copper and iron salts from precipitating in aqueous solutions. Many of these agents are capable of functioning over limited pH ranges as for example, substantially neutral pH ranges, but are insufficiently stable or for other reasons are ineffective at high alkaline pH's. Other materials, while effective over wider pH ranges, require usage in such amounts that particularly where high concentrations of salts such as iron and copper are found, their use is not economically feasible.

Therefore, it is a principal object of the present invention to provide a method for the prevention of copper and iron salts from precipitating from aqueous solutions having an alkaline pH, which solutions were acidic.

It is a further object of this invention to provide a method for the prevention of the deposition of copper and iron salts from alkaline solutions which is simple, direct, relatively inexpensive, and overcomes many of the deficiencies of the anti-precipitating agents of prior art.

These and other objects and advantages of this invention will become more apparent from the detailed description set forth hereinbelow.

2

The process of this invention is carried out by adding to aqueous solutions containing copper and iron salts having acid pH's water-soluble polyelectrolytes, having an average molecular weight of at least 10,000 and having a structure derived by the substantially linear polymerization of at least one mono-olefinic compound through the aliphatic unsaturated bond. After the addition of the water-soluble polyelectrolyte, or simultaneously therewith, the aqueous solution is rendered alkaline.

The present invention is based on the fact that copper and iron salts as for example, ferrous chloride, ferric chloride, ferrous sulfate, ferric sulfate, cuprous sulfate, cupric sulfate, cuprous chloride, cupric chloride and the like are soluble in acidic aqueous solutions. With respect to copper and iron salts, as the pH of the solution approaches the neutral point and becomes alkaline, these salts will normally precipitate. With respect to iron salts, this precipitation commences at about pH 6. With respect to copper salts, this precipitation commences at about pH 7. Water in various processes undergoes pH changes from the acid to the alkaline side. Such waters, regardless of the specific operation, are contemplated for treatment in accordance with this invention. Here it should be noted that if the copper or iron salt precipitate out, i. e., if the aqueous solution containing the metal salt is allowed to become alkaline prior to the addition of the polyelectrolytes of this invention, the salts cannot be returned to solution regardless of how much polyelectrolyte is reemployed. Thus the function of the polyelectrolytes of this invention are different from the function of sequestering agents.

By the expression "alkaline solution" and similar expressions as they are employed in the present specification, it is intended to include solutions having a pH of between 6 and 14, as well as alkaline solutions containing strong alkaline concentrations, as for example, the equivalent of a 5% caustic solution. As will be seen hereinafter, the present process is particularly effective for the treatment of waters which will undergo change from an acidic pH to a high alkaline pH, which high alkaline pH is maintained for extended periods of time. By "high alkaline" pH as that and similar expressions are employed herein, it is meant solutions having an alkalinity of at least 10 when the solution contains copper salts and a pH of between 9 and 12 when the solution contains iron salts. It will be noted that with respect to these high pH values, the water-soluble polyelectrolytes of this invention perform surprisingly well where other materials supposedly useful for such purposes fail.

By "high iron concentration" as that and similar terms are employed, it is intended to include solutions containing iron in amounts of at least 5 parts per million, although solutions containing up to as much as 2,000 or even 5,000 parts per million or more are contemplated.

By the expression "high copper content" it is meant that the aqueous solution contains at least ½ part per million of copper, although solutions containing several hundred or as much as 1,000 or 2,000 parts per million are contemplated.

The synthetic polymeric water-soluble polyelectrolytes contemplated for use in the present invention may be any of a number of a wide variety of such polyelectrolytes having an average molecular weight of at least 10,000 with respect to usage in aqueous media containing copper salts and preferably an average molecular weight of at least 20,000 for use in aqueous media containing iron salts and having a structure derived by the substantially linear polymerization of at least one mono-olefinic compound through the aliphatic unsaturated group.

Particularly suitable polyelectrolytic polymers for use in the present invention are the polymers of acrylic or methacrylic acid derivatives, for example, acrylic acid, the alkali metal and ammonium salts of acrylic acid, methacrylic acid, the alkali metal and ammonium salts of methacrylic acid, acrylamide, methacrylamide, the N-alkyl substituted amides, the N-aminoalkylamides, and the corersponding N-alkylaminoalkyl substituted amides, the aminoalkyl acrylates, the aminoalkyl methacrylamides and the N-alkyl substituted aminoalkyl esters of either acrylic or methacrylic acids. These polymeric materials may be homopolymers or they may be copolymers with other copolymerizing monomers such as ethylene, propylene, isobutylene, styrene, α-methylstyrene, vinyl acetate, vinyl formate, alkyl ethers, acrylonitrile, methacrylonitrile, vinyl chloride, vinylidene chloride, the alkyl acrylates, the alkyl methacrylates, the alkyl maleates, and the alkyl fumarates, and other olefinic monomers copolymerizable therewith. The copolymers of this type, having at least 50 mole percent of the acrylic or methacrylic acid derivatives, are preferred, and especially when the comonomer is hydrophobic or has no ionizable groups. Polymers of this type may be prepared directly by the polymerization of suitable monomers, or by the after chemical reaction of other polymers, for example, by the hydrolysis of acrylonitrile or methacrylonitrile polymers.

In connection with the various types of polyelectrolytic polymers suitable for the practice of this invention, the hydrophilic polymer may be prepared directly by the polymerization or copolymerization of one or more of the various available organic monomers with aliphatic unsaturation, if the said compounds contain a hydrophilic group, for example carboxyl groups. Generally, more types of polyelectrolytic polymers can be prepared by subsequent reactions of polymers and copolymers. For example, polymers containing nitrile groups may be hydrolyzed to form water-soluble amide and carboxy-containing polymers or hydrogenated to form amine-containing polymers. Similarly, copolymers of maleic anhydride and vinyl acetate may be hydrolyzed to form polymers containing hydrophilic lactone rings. Other hydrophilic polymers may be prepared by the hydrolysis of copolymers of vinyl acetate wherein the acetyl groups are removed, leaving hydroxy groups which promote the solubilization effect of polyelectrolytic groups present. By other reactions non-hydrophilic polymers may be converted into lactam or amide-containing polymers which are more hydrophilic. Polyvinyl alcohol, not in itself a polyelectrolyte, may be converted into polyelectrolytes by esterification with dibasic acids, one of said carboxylic acid groups reacting with the alcohol radical and the other providing the hydrophilic characteristics by a carboxy group on the side chain. Still other types of polymers may be prepared by reacting halogen containing polymers, for example, the polymers or copolymers of vinyl chloroacetate or vinyl chloroethyl ether, with amines to form amine salt radicals and quaternary ammonium radicals whereby hydrophilic characteristics are introduced into what otherwise would be an insoluble polymer. Other soluble polymers may be prepared by the ammonolysis of ketone-containing polymers, for example, polyvinyl methyl ketone. Similarly, active halogen atoms may be reacted with bisulfite to substitute sulfonic acid groups for the reactive halogens.

Thus, the various polyelectrolytes of the types described above are ethylenic polymers having numerous side chains distributed along a substantially linear continuous carbon atom molecule. The side chains may be hydrocarbon groups, carboxylic acid groups or derivatives thereof, sulfonic acid groups, or derivatives thereof, phosphoric acid or derivatives thereof, heterocyclic nitrogen groups, amino-alkyl groups, alkoxy radicals and other organic groups, the number of which groups and the relative proportions of hydrophilic and hydrophobic groups being such as to provide a water-soluble polymeric compound having a substantially large number of ionizable radicals.

Among the various polymers as described above and water-soluble salts thereof useful in the practice of the present invention, there may be mentioned hydrolyzed polyacrylonitrile and polyacrylamide, sulfonated polystyrene, acrylamide-acrylic acid copolymers, polyacrylic acid, ½ calcium salt of hydrolyzed 1:1 copolymer of vinyl acetate-maleic anhydride, hydrolyzed styrenemaleic anhydride copolymer, ammonium polyacrylate, sodium polyacrylate, ammonium polymethacrylate, sodium polymethacrylate, diethanolammonium polyacrylate, guanidinium polyacrylate, dimethylaminoethyl polymethacrylate, acrylamide-acrylonitrile copolymer, methacrylic acid-dimethylaminoethyl methacrylate copolymer, sodium polyacrylate-vinyl alcohol copolymer, hydrolyzed methacrylic acid-acrylonitrile copolymer, vinyl acetate-maleic anhydride copolymer, vinyl formate-maleic anhydride copolymer, vinyl methyl ether-maleic anhydride copolymer, isobutylene-maleic anhydride copolymer, styrene-maleic anhydride copolymer, ethyl acrylate, maleic anhydride copolymer, vinyl chloride-maleic anhydride copolymer, hydrolyzed acrylonitrilevinyl acetate copolymer, hydrolyzed acrylonitrile-methacrylonitrile copolymer, hydrolyzed acrylonitrile-methacrylonitrile-vinyl acetate terpolymer, hydrolyzed acrylonitrile-methacrylic acid copolymer, vinyl pyridine-acrylonitrile copolymer, etc. Polymers containing cation-active groups are also useful. Suitable compounds are, for example, ethyl acrylate and acrylamidopropylbenzyldimethylammonium chloride, copolymers of methylolacrylamide and acrylamidopropylbenzyldimethylammonium chloride, copolymers of butadiene and 2-vinyl pyridine, and certain quaternary compounds such as polydimethylaminostyrene quaternized with benzylchloride, allyl chloride, etc., and quaternized copolymers of vinyl alcohol and morpholinylethylvinylether and the like.

Among the especially preferred polymeric compounds are the sodium salts of hydrolyzed polyacrylonitrile and hydrolyzed, preferably alkali hydrolyzed, polyacrylamides. Copolymers of acrylamide and acrylic acid are also highly effective. The sodium salts of hydrolyzed polyacrylonitriles may be prepared in the conventional manner, i.e., by subjecting polyacrylonitrile to hydrolysis with sodium hydroxide, for example. The hydrolysis usually goes to about 75% completion, or in other words, about three out of every four nitrile groups are hydrolyzed to carboxylic acid groups. The hydrolyzed polyacrylamides may be prepared by subjecting a polyacrylamide to hydrolysis, either under alkali or acid conditions. That is to say, sodium hydroxide, for example, may be used, or a strong acid may be used. In either event, the hydrolysis is about 50–60% effective so that the final products consist of a hydrolyzed polymer having varying ratios of amide and carboxylic acid groups. Copolymers of acrylamide and acrylic acid are prepared by copolymerizing these two materials.

When these especially preferred polymers are to be used in the practice of the present invention, it has been found that the polymers should contain at least about 10% carboxy groups.

The polymers obtained by hydrolyzing polymeric material containing polyacrylonitrile are cheap and give excellent results. Here again, the polymer may be a homopolymer or the acrylonitrile may be copolymerized with small amounts of other materials, such as vinyl pyridine, vinyl acetate, styrene, vinyl ethers, vinyl halides, acrylic esters and the like.

In general, the average molecular weight of the polymers employable in the present process may range from about 10,000 to the limit of water solubility. Polymers of over 1 million usually dissolve with difficulty. The upper molecular weight limit appears to be critical only insofar as it is set by the practical difficulty of making these highly polymerized materials which are soluble.

With respect to the prevention of the precipitation of copper salts by the present process, it has been determined, as will be evidenced by the examples hereinafter, that at pH values up to 10, the molecular weight of the polyelectrolyte does not appear to be critical within the above description. That is to say, at pH values up to 10, polyelectrolytes within the above defined average molecular weight range may, to a large extent, be uniformly successfully employed. With respect to strongly alkaline solutions in order to prevent the deposition of the copper effectively, it appears to be highly desirable if not essential that the polyelectrolytes have a molecular weight of the order of about 75,000 up to the practical limit of solubility.

With respect to the average molecular weight of the water soluble polyelectrolyte to be added to the iron salt containing solutions in accordance with this invention these polymers should have an average molecular weight of at least 20,000 to the limit of water solubility. Polymers of over 1 million usually dissolve with difficulty. The upper molecular weight limit appears to be critical only insofar as it is set by the practical difficulty of making highly polymerized materials which are water soluble. It is greatly preferred that the average molecular weight be a value from between about 50,000 and 750,000 for superior results in the prevention of precipitation of iron salts from alkaline solutions.

The average molecular weights referred to herein are determined from a standard graph relating light scattering molecular weight to the relative viscosity of the polymer at 30° C. in an Ostwald type viscometer. The viscosities of the polyelectrolytes are measured at a 0.5 gram per 100-milliliter concentration adjusted to pH 7. This value is thereafter employed to determine molecular weight from the above-said graph.

The following examples are given primarily by way of illustration in order that the present invention may be more readily understood. No specific details or enumerations contained therein should be construed as limiting the present invention, except as they appear in the appended claims.

EXAMPLE 1

A copper sulfate solution containing 200 parts per million of copper was prepared, as was a solution containing 1000 parts per million of sodium carbonate.

250-cc. volumes of the copper solution were transferred to 600-cc. breakers and known amounts of a polyacrylic acid having an average molecular weight of 23,000 were added to each of these beakers.

Thereafter, 250-cc. volumes of the sodium carbonate solution were added to these beakers. The solutions, having a pH between 8 and 10, were allowed to stand for two hours, after which the precipitated copper salt was filtered off and the filtrate assayed for copper content.

A "control" test was run in which no polyelectrolyte was employed.

The results of Example 1 are indicated in Table I hereinbelow.

Table I

| Polyelectrolyte, p.p.m. | Copper,[1] p.p.m. |
| --- | --- |
| 0 (Control) | 0 |
| 25 | 19 |
| 50 | 46 |
| 100 | 100 |

[1] Copper held in solution.

EXAMPLE 2

The procedures and solutions employed were the same as those in Example 1, with the exception that the polyelectrolyte was a hydrolyzed polyacrylonitrile sodium salt having an average molecular weight of about 10,000.

The results of Example 2 are indicated in Table II hereinbelow.

Table II

| Polyelectrolyte, p.p.m. | Copper,[1] p.p.m. |
| --- | --- |
| 0 (Control) | 0 |
| 100 | 41 |
| 200 | 97 |
| 500 | 100 |

[1] Copper held in solution.

EXAMPLE 3

A copper sulfate solution containing 300 parts per million of copper was prepared, as was a solution containing 1000 parts of sodium carbonate.

250-cc. portions of the copper sulfate were measured out and various amounts of a hydrolyzed polyacrylonitrile sodium salt having an average molecular weight of 350,000 were added thereto. Thereafter, 250-cc. portions of the sodium carbonate solutions were also added. The pH of each of these test samples was then brought up to 11 by the addition of sodium hydroxide. The solutions were allowed to stand for 24 hours, after which they were filtered and the filtrate assayed for copper content.

The results of these tests are shown in Table III hereinbelow.

Table III

| Polyelectrolyte, p.p.m. | Copper,[1] p.p.m. |
| --- | --- |
| 0 (Control) | 0 |
| 50 | 6 |
| 100 | 51 |
| 200 | 95 |
| 500 | 124 |

[1] Copper held in solution.

EXAMPLE 4

Copper sulfate solutions were prepared containing 320 parts per million of copper, as was a sodium carbonate solution containing 1000 parts per million of sodium carbonate.

250-cc. portions of the former were taken and various amounts of polyacrylic acid-polyelectrolytes having different molecular weights were added thereto.

250-cc. volumes of the sodium carbonate were added to these samples and the pH of each test was brought to 11.8 by the addition of sodium hydroxide. The samples were allowed to stand for 120 hours, after which they were filtered and the amount of copper held in solution in the filtrate was assayed for.

The results of these tests are illustrated in Table IV hereinbelow.

Table IV

| Mol. wt. of Polyelectrolyte | Polyelectrolyte, p.p.m. | Copper,[1] p.p.m. |
| --- | --- | --- |
| 33,000 | 0 (Control) | 0 |
| 33,000 | 100 | 30 |
| 33,000 | 200 | 44 |
| 33,000 | 500 | 42 |
| 53,000 | 100 | 28 |
| 53,000 | 200 | 48 |
| 53,000 | 500 | 108 |
| 110,000 | 100 | 20 |
| 110,000 | 200 | 108 |
| 110,000 | 500 | 152 |
| 230,000 | 100 | 15 |
| 230,000 | 200 | 149 |
| 230,000 | 500 | 160 |
| 380,000 | 100 | 25 |
| 380,000 | 200 | 149 |
| 380,000 | 500 | 160 |

[1] Copper held in solution.

Table IV hereinabove illustrates rather clearly that in strongly alkaline solutions, after extended ageing periods, the polyelectrolyte, in order to be effective, must be characterized by a minimum average molecular weight on the order of about 75,000. This is evidenced by the fact that a polyelectrolyte having an average molecular weight of some 33,000 was ineffective, even though excessive amounts of the polyelectrolyte were employed with respect to the amount of copper in solution. It can further be seen from Table IV that a polyelectrolyte having an average molecular weight of some 53,000, when employed in an amount equal to some three times the concentration of the copper in solution, was ineffective for the prevention of complete deposition of the copper.

EXAMPLE 5

Solutions the same as employed in Example 4 were prepared, and the same series of polyelectrolytes as were employed in Example 4 were used herein. However, the solutions of the polyelectrolyte were neutralized to a pH of 7 with sodium hydroxide before being added to the copper solution.

Sodium carbonate was used as the alkaline precipitate, but no sodium hydroxide was added. The pH range was 9 to 9.5 and the time of standing was 95 hours. The copper held in solution was determined in the usual manner.

The results of these experiments are illustrated in Table V hereinbelow.

Table V

| Mol. wt. of Polyelectrolyte | Poly-electrolyte, p.p.m. | Copper,[1] p.p.m. |
| --- | --- | --- |
| | 0 (Control) | 0 |
| 33,000 | 100 | 36 |
| 33,000 | 200 | 75 |
| 33,000 | 500 | 160 |
| 53,000 | 100 | 24 |
| 53,000 | 200 | 54 |
| 53,000 | 500 | 160 |
| 110,000 | 100 | 12 |
| 110,000 | 200 | 42 |
| 110,000 | 500 | 160 |
| 230,000 | 100 | 12 |
| 230,000 | 200 | 75 |
| 230,000 | 500 | 160 |
| 380,000 | 100 | 6 |
| 380,000 | 200 | 68 |
| 380,000 | 500 | 160 |

[1] Copper held in solution.

Table V hereinabove illustrates by comparison with Table IV that the lower average molecular weight polyelectrolytes, as for example, those having an average molecular weight of 33,000 and 53,000, may be rendered highly effective in the present process where the alkaline composition has a pH value of less than 10.

EXAMPLE 6

A solution of ferric chloride in water was prepared. The solution contained 270 parts per million of ferric iron and the pH was from 1.5 to 2. This solution was labeled solution A.

A second solution was prepared by dissolving 4.05 parts of sodium bicarbonate per liter of water. This solution was labeled solution B.

250-ml. volumes of solution B were transferred to 1000-ml. bottles and graduated known amounts of polyacrylic acid having a molecular weight of around 20,000 were added to each. 250-ml. volumes of solution A were then added to each of the 1000-ml. bottles. The total ferric iron in the combined solutions was 135 parts per million. The pH of the combined solutions was then adjusted to 7.5–8 by the addition of a few drops of strong caustic soda.

The solutions were allowed to stand for 200 hours to determine effectiveness for extended times, after which the amount of ferric iron held in solution was determined.

A "blank" or control test was run in which no polyacrylic acid was used. The results of these tests are illustrated in Table VI hereinbelow.

Table VI

| Polyelectrolyte, p.p.m. | Ferric Iron,[1] p.p.m. |
| --- | --- |
| 0 (Control) | 0 |
| 100 | 119 |
| [2] 114 | 135 |
| 200 | 135 |
| 500 | 145 |

[1] Held in solution.
[2] Minimum for complete solution.

EXAMPLE 7

An aqueous solution of ferric chloride was prepared, analyzing 320 parts per million of ferric iron and having a pH of from 1.5 to 2.

An aqueous sodium hydroxide solution was prepared by dissolving 0.05% of sodium hydroxide in water. The solution had a pH of 12.

250-ml. volumes of the sodium hydroxide solution were transferred to 600-ml. containers and graduated amounts of polyacrylic acid having an average molecular weight of around 50,000 were added thereto. 250-ml. volumes of the ferric chloride solution were then added to the caustic-polyelectrolyte solution to provide solutions containing 160 parts per million of ferric iron. The pH values were then adjusted to 11 to determine the effect of higher pH on the process by adding a few drops of strong sodium hydroxide. The containers were allowed to stand for 24 hours, after which the amount of ferric iron held in solution was determined. A control test, in which no polyacrylic acid was used, was also run. The results are shown in Table VII hereinbelow.

Table VII

| Polyelectrolyte, p.p.m. | Ferric Iron,[1] p.p.m. |
| --- | --- |
| 0 (Control) | 0 |
| 10 | 22 |
| 50 | 128 |
| [2] 64 | 160 |
| 100 | 160 |
| 200 | 160 |

[1] Held in solution.
[2] Minimum for complete solution.

Thus, it will be seen from Example 7 that 1 part of polyacrylic acid of average molecular weight 50,000 will hold approximately 2.5 parts of ferric iron in solution.

EXAMPLE 8

An aqueous solution of ferrous sulfate was prepared, analyzing 320 parts per million of ferrous iron and having a pH of from 1.5 to 2.

A second solution was prepared by dissolving 4.05 grams of sodium bicarbonate in 1 liter of water.

250-ml. volumes of the second solution were transferred to 600-ml. containers and graduated amounts of polyacrylic acid having an average molecular weight of about 50,000 were added. Then 250-ml. volumes of the ferrous sulfate solution were added. The amount of ferrous iron in the combined solutions was 160 parts per million.

In one series of tests employing the above materials, the pH values were adjusted to 7.5 by the addition of caustic soda.

In the second series, the pH values were adjusted to 10.5 with caustic soda.

At the end of a 24-hour waiting period, the amounts of ferrous iron held in solution were determined.

The results are shown in Table VIII hereinbelow.

Table VIII

| Polyelectrolyte, p.p.m. | Ferrous Iron[1] at pH 7.5, p.p.m. | Ferrous Iron,[1] at pH 10.5, p.p.m. |
| --- | --- | --- |
| 0 (Control) | 0 | 0 |
| 25 | 20 | 50 |
| [2] 50 | 50 | 160 |
| [2] 100 | 160 | 160 |
| 200 | 160 | 160 |

[1] Held in solution.
[2] Minimum for complete solution.

Table VIII hereinabove illustrates that the present invention is more effective in more strongly alkaline pH's in that smaller amounts of the polyelectrolyte are able to effectively hold in solution larger amounts of iron at the higher pH valve.

EXAMPLE 9

The procedure of Example 7 was followed, with the exception that the combined solutions were allowed to stand for 12 weeks at a pH of 11 in order to determine the effectiveness of the process over extended time periods at high alkaline pH's. The solutions contained 160 p.p.m. of ferric iron. The results are shown in Table IX hereinbelow.

Table IX

| Polyelectrolyte, p.p.m. | Ferric Iron,[1] p.p.m. |
| --- | --- |
| 0 (Control) | 0 |
| 100 | 70 |
| 200 | 157 |
| [2] 203 | 160 |
| 300 | 160 |

[1] Held in solution.
[2] Minimum for complete solution.

Table IX hereinabove illustrates that the present process is effective, even though alkaline iron-containing solutions stand for extensive periods of time. However, it appears that a larger concentration of polyelectrolyte is required to completely retain the iron in an aged solution.

EXAMPLE 10

An aqueous ferric chloride solution analyzing 306 p.p.m. of ferric iron and having a pH of 1.5 and an aqueous 0.05% sodium hydroxide solution was prepared.

250-ml. volumes of the caustic solution were transferred to 600-ml. beakers and graduated amounts of a polyacrylic acid having an average molecular weight of around 50,000 were added. Then, 250-ml. volumes of the ferric chloride solution were added to the caustic-polyelectrolyte solution and the pH values adjusted to 11 by the addition of strong sodium hydroxide solution.

The solutions were then boiled down to 250 ml. in 3 hours on a hot plate so that the amount of iron in solution was 306 p.p.m. The amounts of ferric iron held in solution were determined. The results are shown in Table X hereinbelow.

Table X

| Polyelectrolyte, p.p.m. | Ferric Iron,[1] p.p.m. |
| --- | --- |
| 0 (Control) | 0 |
| 200 | 270 |
| [2] 237 | 306 |
| 500 | 306 |

[1] Held in solution.
[2] Minimum for complete solution.

Table X hereinabove indicates that the present process is effective, even though solutions containing the polyelectrolyte are subject to boiling for extended periods of time.

EXAMPLE 11

The procedure employed was substantially the same as that employed in Example 7, except that graduated amounts of polyacrylic acids of different average molecular weights were used. The pH values of the mixed solutions were 11 and the solutions were allowed to stand for 8 weeks prior to evaluation. The solutions contained 160 p.p.m. of ferric iron. The results are shown in Table XI hereinbelow.

Table XI

| Polyelectrolyte, Mol. Wt. | Polyelectrolyte, p.p.m. | Ferric Iron,[1] p.p.m. |
| --- | --- | --- |
| 33,000 | 100 | 20 |
| 33,000 | 200 | 130 |
| 33,000 | 500 | 157 |
| 33,000 | [2] 508 | 160 |
| 110,000 | 100 | 70 |
| 110,000 | 200 | 158 |
| 110,000 | [2] 203 | 160 |
| 110,000 | 500 | 160 |
| 230,000 | 100 | 70 |
| 230,000 | [2] 112 | 160 |
| 230,000 | 200 | 160 |
| 230,000 | 500 | 160 |
| 380,000 | 100 | 70 |
| 380,000 | [2] 112 | 160 |
| 380,000 | 200 | 160 |
| 380,000 | 500 | 160 |
| Control | 0 | 0 |

[1] Held in solution.
[2] Minimum for complete solution.

Table XI hereinabove illustrates that with respect to aged solutions the higher average molecular weight polyelectrolytes are more effective than are the lower molecular weight materials.

EXAMPLE 12

The procedure employed was the same as that in Example 7, except that a copolymer of acrylamide and vinyl phosphoric acid was employed. The pH of the ferric solution was from between 7 and 8 and the solution had been allowed to stand for 24 hours. The results are shown in Table XII hereinbelow.

Table XII

| Polyelectrolyte, p.p.m. | Ferric Iron,[1] p.p.m. |
| --- | --- |
| 0 (Control) | 0 |
| 50 | 36 |
| 100 | 89 |
| [2] 180 | 160 |
| 200 | 160 |

[1] Held in solution.
[2] Minimum for complete solution.

EXAMPLE 13

A ferric chloride solution was prepared, analyzing 160 parts per million of ferric iron and having a pH of 1.5. 500-cc. portions were transferred to 600-cc. beakers. Graduated amounts of a hydrolyzed polyacrylonitrile sodium salt having a molecular weight of about 350,000 were added. The pH of the solutions was adjusted to 11 by the addition of a 25% sodium hydroxide solution. The solutions were allowed to stand 72 hours, after which the iron held in solution was determined. The results are shown in Table XIII hereinbelow.

Table XIII

| Polyelectrolyte, p.p.m. | Ferric Iron,[1] p.p.m. |
| --- | --- |
| 0 (Control) | 0 |
| 35 | 130 |
| [2] 43 | 160 |
| 50 | 160 |
| 100 | 160 |

[1] Held in solution.
[2] Minimum for complete solution.

Table XIII illustrates the superior effectiveness of the present process when employing a preferred polyelectrolyte and further illustrates that effectiveness is not dependent upon whether the polyelectrolyte is added to the iron-containing portion of a mixture or the alkaline solution, as in previous examples. As will be seen from the above table, 1 part of this particular polyelectrolyte will hold about 3.7 parts of iron in solution.

EXAMPLE 14

To 500 cc. of a solution containing 160 parts per million of ferric iron there was added 330 parts per mlilion of a polyacrylic acid having an average molecular weight of about 230,000. Sodium hydroxide was added to bring the pH of the solution to 11. The solution was allowed to stand for 2 weeks and it was observed that no iron was precipitated.

200 cc. of this solution was transferred to a 400-cc. beaker and boiled on a hot plate for 90 minutes while covered; no iron was precipitated. The cover was removed and the solution permitted to evaporate down to 20 cc. No iron was precipitated, although the concentration reached 1600 parts per million of ferric iron.

EXAMPE 15

The procedure of Example 14 was adhered to, except that in lieu of the polyacrylic acid a hydrolyzed polyacrylonitrile sodium salt having an average molecular weight of about 350,000 was substituted.

No iron was precipitated on boiling. The solution was evaporated down from 200 c. to 50 cc. before iron began to precipitate out.

Examples 14 and 15 hereinabove illustrate that the present process is effective, even though the treated solution is boiled and concentrated and is effective in highly concentrated solutions, as for example, those containing 1600 and more p.p.m. of ferric iron.

EXAMPLE 16

A solution of ferrous sulfate containing 150 parts per million of ferrous iron was prepared. 500-cc. portions of this solution were measured out and various amounts of a hydrolyzed polyacrylonitrile sodium salt having a molecular weight of about 350,000 were added. The pH of each solution was brought to 11 by the addition of a 25% sodium hydroxide solution.

The solutions were allowed to stand for 24 hours, after which the amount of ferrous iron held in solution was determined. The results are shown in Table XIV hereinbelow.

*Table XIV*

| Polyelectrolyte, p.p.m. | Ferrous Iron,[1] p.p.m. |
|---|---|
| 0 (Control) | 12 |
| 100 | 29 |
| [2] 200 | 150 |
| 300 | 150 |

[1] Held in solution.
[2] Minimum for complete solution.

EXAMPLE 17

A series of tests similar to those run in Example 16 were carried out. Instead of employing the hydrolyzed polyacrylonitrile sodium salt referred to therein, a hydrolyzed polyacrylonitrile sodium salt having an average molecular weight of about 10,000 was employed. The results are shown in Table XV hereinbelow.

*Table XV*

| Polyelectrolyte, p.p.m. | Ferrous Iron,[1] p.p.m. |
|---|---|
| 0 (Control) | 12 |
| 100 | 74 |
| 200 | 91 |
| [2] 300 | 150 |

[1] Held in solution.
[2] Minimum for complete solution.

EXAMPLE 18

A solution of ferric chloride containing 5 parts per million of ferric iron was prepared. 500-cc. portions of this solution were measured out and various amounts of polyacrylic acid of different average molecular weight were added. The pH of each solution was brought to 11 by addition of a 25% solution of sodium hydroxide.

The solutions were allowed to stand for 24 hours, after which the amount of ferric iron held in solution was determined. The results are shown in Table XVI.

*Table XVI*

| Polyelectrolyte, Mol. Wt. | Polyelectrolyte, p.p.m. | Ferric Iron Held in Solution, p.p.m. |
|---|---|---|
| Control | 0 | 0 |
| 33,000 | 1 | 1.6 |
| 33,000 | 2 | 5.0 |
| 33,000 | 5 | 5.0 |
| 380,000 | 0.5 | 2.2 |
| 380,000 | 1 | 1.6 |
| 380,000 | 2 | 5.0 |
| 380,000 | 5 | 5.0 |

EXAMPLE 19

A series of tests similar to those run in Example 18 were run, except that as the polyelectrolyte hydrolyzed, polyacrylonitrile of different average molecular weight was used instead of polyacrylic acid. The results are shown in Table XVII.

*Table XVII*

| Polyelectrolyte, Mol. Wt. | Polyelectrolyte, p.p.m. | Ferric Iron Held in Solution, p.p.m. |
|---|---|---|
| Control | 0 | 0 |
| 10,000 | 1 | 0 |
| 10,000 | 2 | 0 |
| 10,000 | 5 | 0 |
| 350,000 | 1 | 0 |
| 350,000 | 2 | 1.7 |
| 350,000 | 5 | 5.0 |

Table XVII hereinabove illustrates that polyelectrolytes having an average molecular weight of 10,000 are ineffective as anti-precipitating agents in solutions containing iron concentrations of 5 p.p.m.

This application is a contination-in-part of our copending applications, Serial Numbers 722,635 and 722,649, filed March 20, 1958, and now abandoned.

We claim:
1. A process for inhibiting the deposition of iron compounds which comprises adding to an aqueous solution having a pH below 6 and containing at least 5 parts per million of iron as iron salts a water-soluble polyelectrolyte having an average molecular weight of at least 20,000 having a structure derived by the substantially linear polymerization of at least one mono-olefinic compound through the aliphatic unsaturated bond and thereafter adjusting the pH of said solution to a value of at least 7.5 whereby precipitation of said iron salts is prevented for long periods.
2. A process according to claim 1 in wihch the pH of the iron-containing solution after the addition of the water-soluble polyelectrolyte is adjusted to a value of between 9 and 12.

3. A process according to claim 2 in which the water-soluble polyelectrolyte added to the iron salt-containing solution has an average molecular weight of between 50,000 and 750,000.

4. A process according to claim 2 in which the water-soluble polyelectrolyte is polyacrylic acid.

5. A process according to claim 2 in which the water-soluble polyelectrolyte is a hydrolyzed ployacrylonitrile sodium salt.

6. A process for inhibiting the deposition of copper compounds which comprises adding to aqueous solutions having a pH less than 7 and containing copper salts, a water-soluble polyelectrolyte having an average molecular weight of at least 10,000 and having a structure derived by the substantially linear polymerization of at least one mono-olefinic compound through the aliphatic unsaturated bond in a quantity equal to at least the weight of the copper salt and thereafter rendering said solution more alkaline than about pH 9, whereby precipitation of said copper salts is prevented for long periods.

7. A process according to claim 6 in which the pH of the copper salt solution after the addition of the water-soluble polyelectrolyte is adjusted to a pH of at least 10 and the water-soluble polyelectrolyte has an average molecular weight of at least 75,000.

8. A process according to claim 7 in which the water-soluble polyelectrolyte is a polyacrylic acid.

9. A process according to claim 7 in which the water-soluble polyelectrolyte is a hydrolyzed polyacrylonitrile sodium salt.

References Cited in the file of this patent

UNITED STATES PATENTS

| 2,729,557 | Booth et al. | Jan. 3, 1956 |
| 2,980,610 | Ruehrwein | Apr. 18, 1961 |

FOREIGN PATENTS

| 208,256 | Australia | May 28, 1957 |

OTHER REFERENCES

"Versenes," Technical Bulletin No. 2, published by Bersworth Chemical Co., Framingham, Mass., 4th ed., 1952, sec. 1, pages 2–6 relied upon.

Chemistry of the Metal Chelate Compounds, by Martell and Calvin, Prentice-Hall, Inc., Englewood Cliffs, New Jersey (1952), page 184.

UNITED STATES PATENT OFFICE
CERTIFICATE OF CORRECTION

Patent No. 3,110,666　　　　　　　　　　　　November 12, 1963

Norman Hedley et al.

It is hereby certified that error appears in the above numbered patent requiring correction and that the said Letters Patent should read as corrected below.

Column 1, line 18, strike out "metal salts, and in particular,"; column 5, line 51, for "breakers" read -- beakers --; column 6, line 19, after "sulfate" insert -- solution --; column 9, line 17, for "valve" read -- value --; column 11, line 31, for "200 c." read -- 200 cc. --; column 12, line 74, for "wihch" read -- which --.

Signed and sealed this 2nd day of June 1964.

(SEAL)
Attest:

ERNEST W. SWIDER　　　　　　　　　　　　EDWARD J. BRENNER
Attesting Officer　　　　　　　　　　　　Commissioner of Patents